June 27, 1967  J. D. FANN  3,327,825
CONSTANT SPEED DRIVE
Original Filed Sept. 21, 1960
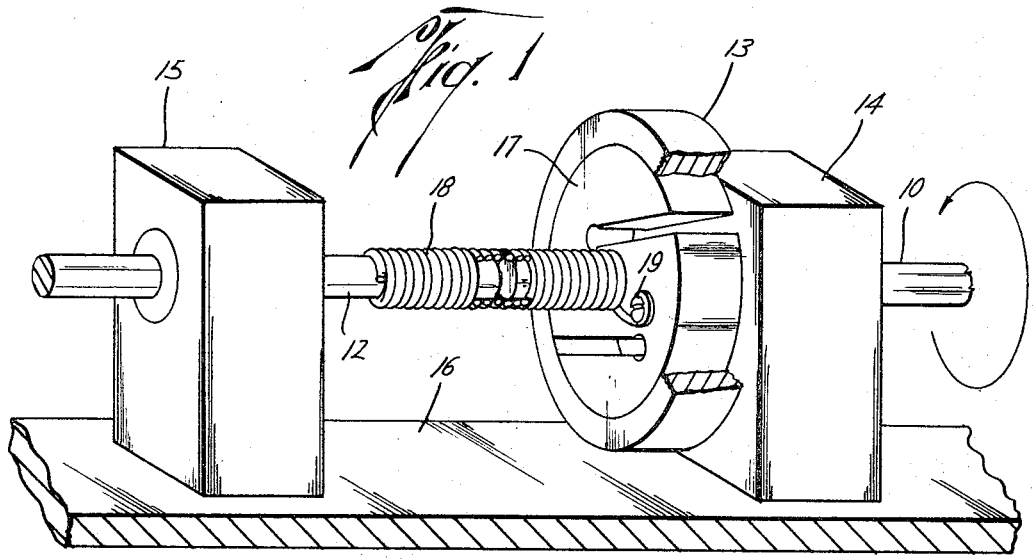
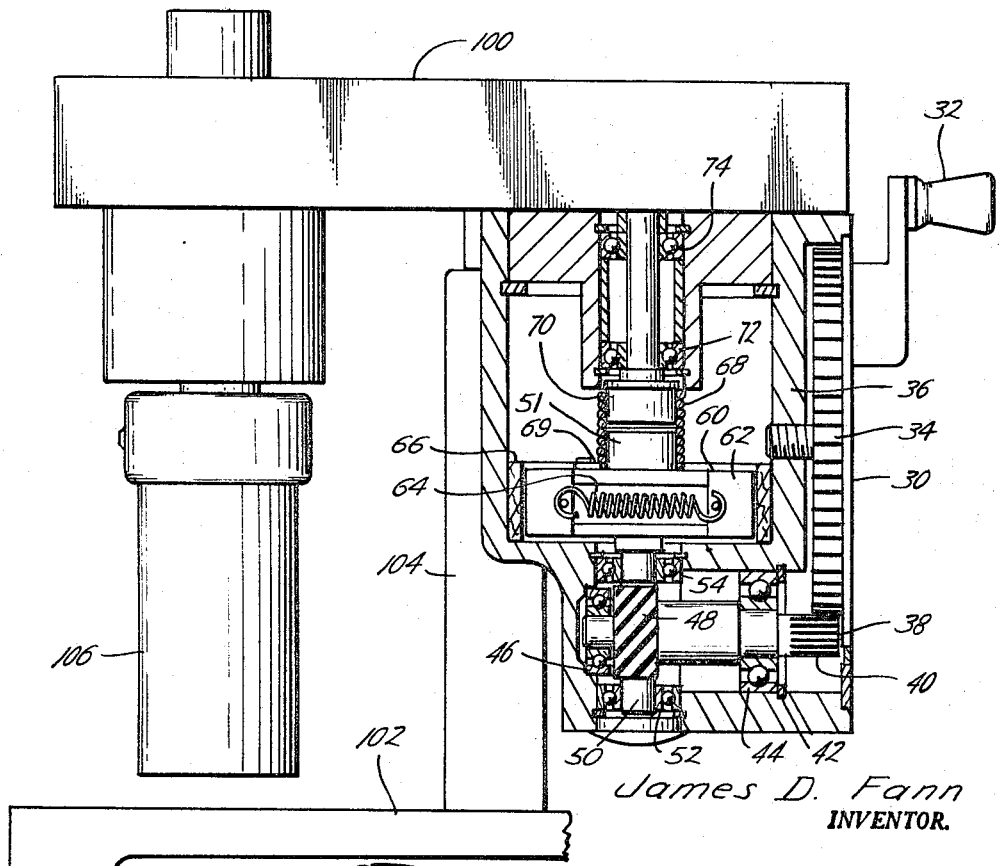
James D. Fann
INVENTOR.

United States Patent Office 3,327,825
Patented June 27, 1967

3,327,825
CONSTANT SPEED DRIVE
James D. Fann, P.O. Box 6101, Houston, Tex.
Continuation of application Ser. No. 366,408, May 11, 1964, which is a continuation of application Ser. No. 57,508, Sept. 21, 1960. This application Mar. 21, 1966, Ser. No. 535,981
1 Claim. (Cl. 192—104)

ABSTRACT OF THE DISCLOSURE

A clutch comprising a coil spring around adjacent ends of a driving shaft and a driven shaft. A centrifugal braking member is rotatably mounted on the driving shaft and secured to one end of the coil spring. When the braking member reaches a predetermined speed, centrifugal force causes it to engage a fixed brake drum and thereby cause the coil spring clutch member to slip on the driving shaft so as to maintain the driver member at a constant speed.

This application is a continuation of my prior copending application S.N. 366,408, filed May 11, 1964, now abandoned, entitled Constant Speed Drive which application was a continuation of my prior application S.N. 57,508, now abandoned, filed Sept. 21, 1960 and also entitled Constant Speed Drive.

This invention pertains generally to drive mechanisms and particularly to a drive mechanism for providing a constant rotational speed to a driven member.

In practicing the invention there is provided a drive shaft which may be driven manually or mechanically. A spring clutch couples the drive shaft to a driven shaft in axial alignment therewith. The drive shaft and driven shaft each are supported by a journal, the journal supporting the drive shaft having attached thereto a centrifugal brake housing. Mounted within the housing and coupled to the spring is a centrifugal brake which is coupled to the drive shaft. Rotation of the drive shaft at an excessive speed provides frictional engagement of the centrifugal brake with the housing thereby causing unwinding of the spring brake and providing slippage of the drive shaft with respect to the centrifugal brake thereby maintaining the driven shaft at constant rotational speed.

Referring now to the drawings:

FIGURE 1 is a side perspective view of an embodiment of the invention.

FIGURE 2 is a partial-sectional side view of another embodiment of the invention.

In FIGURE 1 drive shaft 10 may be rotated by suitable means such as an electric motor in the direction shown. A driven shaft 12 is coupled to drive shaft 10 by a spring 18 which acts as an over-running clutch. Shafts 10 and 12 are supported by journal blocks 14 and 15 which are mounted on base 16. Also journalled to drive shaft 10 is a centrifugal brake 17 which includes a housing 13 rigidly mounted on journal block 14. One end of spring 18 is fastened by screw 19 to centrifugal brake 17.

When drive shaft 10 is rotated at a speed which is faster than the speed desired and for which centrifugal brake 17 is set, segments of centrifugal brake 17 move outwardly and bear against brake housing 13. Friction of the segments against the housing retards the rotation of brake 17 with respect to drive shaft 10. Since spring 18 is fastened to brake 17, the spring partially unwinds on drive shaft 10, thereby providing slippage between spring 18 and drive shaft 10. Driven shaft 12 thus has a rotational speed which is determined by the particular setting of brake 17. Fluctuations of input speed and torque do not affect the rotational speed of the driven shaft. Variations in the loading on the driven shaft also do not affect the driven shaft speed. The device is especially applicable for use with viscometers.

In FIGURE 2 another embodiment of the invention is shown as used in a manually operated portable viscometer. The power unit 30 provides a source of power for conventional viscometer apparatus 100.

The viscometer apparatus comprises a base 102 on which is mounted a column 104 for supporting power unit 30 and the related viscometer apparatus which includes receptacle 106.

Crank 32 may be manually rotated thereby providing rotation of main gear 34 which may be mounted in housing 36. Rotation of gear 34 drives shaft 38 having teeth 40 which mesh with the teeth of gear 34. Shaft 38 is disposed in ring 42 and bearing 44. The other end of shaft 38 is mounted for rotation in bearing 46. A right angle drive gear 48 near the end of shaft 38 provides rotational movement to drive shaft 50 which is positioned in bearings 52 and 54.

Drive shaft 50 is coupled to a centrifugal brake 60 which includes a governor 62 and governor spring 64. Adjacent brake 60 is lining 66.

End 51 of drive shaft 50 is disposed in an over-running spring 68, and end 69 is coupled to centrifugal brake 60.

The uncoupled end of spring 68 is in peripheral engagement with driven shaft 70 which passes through bearings 72 and 74 to drive the related viscometer apparatus in a known manner.

Operation of power unit 30 is similar to the operation described for the embodiment of the invention shown in FIGURE 1. When shaft 50 is rotated below a desired speed determined by the setting of centrifugal brake 60, spring 68 forms a driving connection thereby providing rotation to driven shaft 70 at the same speed as the drive shaft 50. However, as the speed of drive shaft 50 increases to and above the desired set speed, centrifugal brake 60 provides radial expansion of the governor 62 thereby overcoming the force exerted by springs such as 64. As governor 62 expands, it bears against lining 66 thereby causing brake 60 to lag behind the drive shaft 50. Spring 68 is coupled at end 69 to brake 60 and spring 68 unwinds on drive shaft 50 thereby causing slippage between end 51 of drive shaft 50 and spring 68. Driven shaft 70 thus is maintained at a constant rotational speed through slippage which is relatively independent of the torque being transmitted through spring 68.

The invention provides constant rotational speed to a driven shaft which may have a varying load. Fluctuations of input speed and torque do not alter the effectiveness of operation.

While two preferred embodiments of the invention have been shown and described, many modifications thereof can be made by one skilled in the art without departing from the spirit of the invention and it is desired to cover by Letters Patent all forms of the invention falling within the scope of the following claim:

I claim:

A device adapted for use with a viscometer, said device including in combination a drive shaft, a driven member, first and second journals supporting said drive shaft and said driven member respectively, a speed responsive centrifugal brake including a housing concentrically disposed on said drive shaft with said housing being non-rotatably mounted adjacent said first journal, said brake further including centrifugally operated braking means rotatably mounted on said drive shaft and a spring clutch coupling said drive shaft to said driven member, said spring clutch having one end coupled to said centrifugally operated braking means with rotation of said drive shaft above the set speed of said centrifugally operated braking means causing expansion of the same against said housing whereupon said spring clutch unwinds thereby providing slippage between said spring clutch and said drive shaft whereupon said driven member is maintained at a relatively constant rotational speed.

References Cited

UNITED STATES PATENTS

| | | | |
|---|---|---|---|
| 1,735,064 | 11/1929 | Stehle | 192—104 |
| 2,052,961 | 9/1936 | Bonham | 192—104 X |
| 2,829,754 | 4/1958 | Norcross. | |
| 2,868,887 | 1/1959 | Greshel. | |
| 2,910,891 | 11/1959 | Heckethorn. | |

BENJAMIN W. WYCHE, III, *Primary Examiner.*